United States Patent
Rainous et al.

(10) Patent No.: US 6,220,815 B1
(45) Date of Patent: Apr. 24, 2001

(54) INTER-STAGE SEAL RETAINER AND ASSEMBLY

(75) Inventors: Edward A. Rainous; Daniel J. Barber; Edward C. Vickers; Gregory P. Maue, all of Cincinnatti; William E. Cody, West Chester; Sharon L. Yee; Kevin W. McMahan, both of Cincinnati, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/466,554

(22) Filed: Dec. 17, 1999

(51) Int. Cl.$^7$ ..................................................... F04D 29/08
(52) U.S. Cl. .................................... 415/174.5; 416/205 R
(58) Field of Search ............................... 415/174.4, 174.5, 415/173.7, 173.4, 173.5, 230, 214.1, 277

(56) References Cited

U.S. PATENT DOCUMENTS

| | | |
|---|---|---|
| 4,767,267 | 8/1988 | Salt et al. . |
| 5,211,541 | 5/1993 | Fledderjohn et al. . |
| 5,343,694 | 9/1994 | Toborg et al . |
| 5,848,874 | * 12/1998 | Heumann et al. ..................... 415/189 |
| 5,921,749 | * 12/1998 | McLaurin et al. ..................... 415/189 |

OTHER PUBLICATIONS

GE Aircraft Engines "CF6–80C2 Engine Manual", Low Pressure Trubine Stator/Pressure Balance Seal Assembly, Oct. 1, 1995.
GE Aircraft Engines "CF6–80C2 Engine Illustrated Parts Catalog", GE Engine Services Distribution, L.L.C., Sep. 1, 1999.

* cited by examiner

Primary Examiner—F. Daniel Lopez
Assistant Examiner—James M. McAleenan
(74) Attorney, Agent, or Firm—Andrew C. Hess; Nathan D. Herkamp

(57) ABSTRACT

A retainer which, in an exemplary embodiment of the invention, is used in a gas turbine engine inter-stage seal assembly to retain an annular seal ring flange of a seal ring against an annular platform flange extending radially inwardly from an inner platform of an annular nozzle stage having nozzle vanes. The retainer includes a body having a central portion through which a bore is formed around a bore axis and a central tab extends radially outwardly from the central portion with respect to the bore axis. First and second arms, respectively, extend in opposite respective first and second tangential directions, with respect to the bore axis, away from the central portion and each other. Axial spacers extend aftwardly from first and second free ends of the first and second arms, respectively and anti-rotation feet with rounded ends depend from the first and second free ends in an opposite direction from which the central tab extends. A pedestal assembly extends aft from the central portion and is located aft of the central tab. In the exemplary embodiment, the pedestal assembly has a semi-annular cylindrical inner surface circumscribed around the bore axis and a semi-annular cylindrical outer surface wherein the semi-annular cylindrical outer surface extends between generally parallel spaced apart radially inner and outer flats, respectively with respect to the bore axis, and the radially inner flats are coplanar and the radially outer flats are coplanar. Chamfers are formed along the radially inner and outer flats, respectively. The retainer is an integrally cast unit including the body, the central portion, the central tab, the first and second arms, the axial spacers, the anti-rotation feet, and the pedestal assembly.

36 Claims, 5 Drawing Sheets

INTER-STAGE SEAL RETAINER AND ASSEMBLY

BACKGROUND OF THE INVENTION

1. Field of the Invention

This invention relates to inter-stage seal retainers used in gas turbine engine assemblies and, more particularly, to inter-stage seal retainers and assemblies to mount inter-stage turbine seals to nozzles or vane assemblies of gas turbine engines.

2. Discussion of the Background Art

Conventional turbine inter-stage seal retainers are often installed in assemblies that are configured such that they cannot be visually reviewed by the assembler after installation and after complete torquing of the attaching bolt and nut of the retainer. As a result, if too much relative rotation between the retainer and the item to be retained, such as a seal assembly in a turbine section of a gas turbine engine, is allowed, improper assembly is possible. Improper assembly includes having the retained part being clamped inadvertently in the bolted joint or for it to be damaged by the retainer upon application of clamp force due to the bolt during torquing.

The seal assembly in the turbine is intended to be able to translate relative to a nozzle stage of the turbine and the retainer is used to maintain its mounting to the nozzle while allowing limited axial movement.

In the past, proper retainer installation relied upon the experience and feel of the assembler. Radially extending tabs welded on nut cages of the retainer were also used to "fool proof" or insure proper orientation and installation of the retainer.

SUMMARY OF THE INVENTION

A retainer which, in an exemplary embodiment of the invention, is used in a gas turbine engine inter-stage seal assembly to retain an annular seal ring flange of a seal ring against an annular platform flange extending radially inwardly from an inner platform of an annular nozzle stage having nozzle vanes. The retainer includes a body having a central portion through which a bore is formed around a bore axis and a central tab extends radially outwardly from the central portion with respect to the bore axis. First and second arms, respectively, extend in opposite respective first and second tangential directions, with respect to the bore axis, away from the central portion and each other. Axial spacers extending aftwardly from first and second free ends of the first and second arms, respectively, and anti-rotation feet depend from the first and second free ends in an opposite direction from which the central tab extends. A pedestal assembly extends aft from the central portion and is located aft of the central tab. In the exemplary embodiment, the pedestal assembly has a semi-annular cylindrical inner surface and a semi-annular cylindrical outer surface circumscribed around the bore axis wherein the semi-annular cylindrical outer surface extends between generally parallel spaced apart radially inner and outer flats, respectively, with respect to the bore axis, and the radially inner flats are coplanar and the radially outer flats are coplanar. Chamfers are formed along the radially inner and outer flats, respectively. The retainer is an integrally cast unit including the body, the central portion, the central tab, the first and second arms, the axial spacers, the anti-rotation feet, and the pedestal assembly.

In the exemplary embodiment, the pedestal assembly includes first and second mirror image pedestals, respectively, extending aft from the central portion. The first and second pedestals are semi-annular in shape and includes the semi-annular cylindrical outer surface and the cylindrical inner surface which is semi-annular and extends between the inner and outer flats. The anti-rotation feet preferably have rounded ends. The cylindrical inner surface is substantially continuous with a bore surface inside of the bore. The central tab is flush with a flat central aft facing surface of the central portion.

The present invention provides various improvements and advantages over the prior art. The chamfers on the pedestals and the axial location of central tab provide a combination of "fool proofing" and a better angle of installing the pedestals of the retainer in the slots of the seal flange. The shape of the pedestals together with the chamfers provide a more repeatable and accurate seating of the retainer and the pedestals disposed through the slots so as to prevent improper clamping which could cause the pedestals to fail. The rounded ends of the anti-rotation feet provide improved insertion of the pedestals in the slot and proper seating of the retainer as well as improved anti-torquing capabilities.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
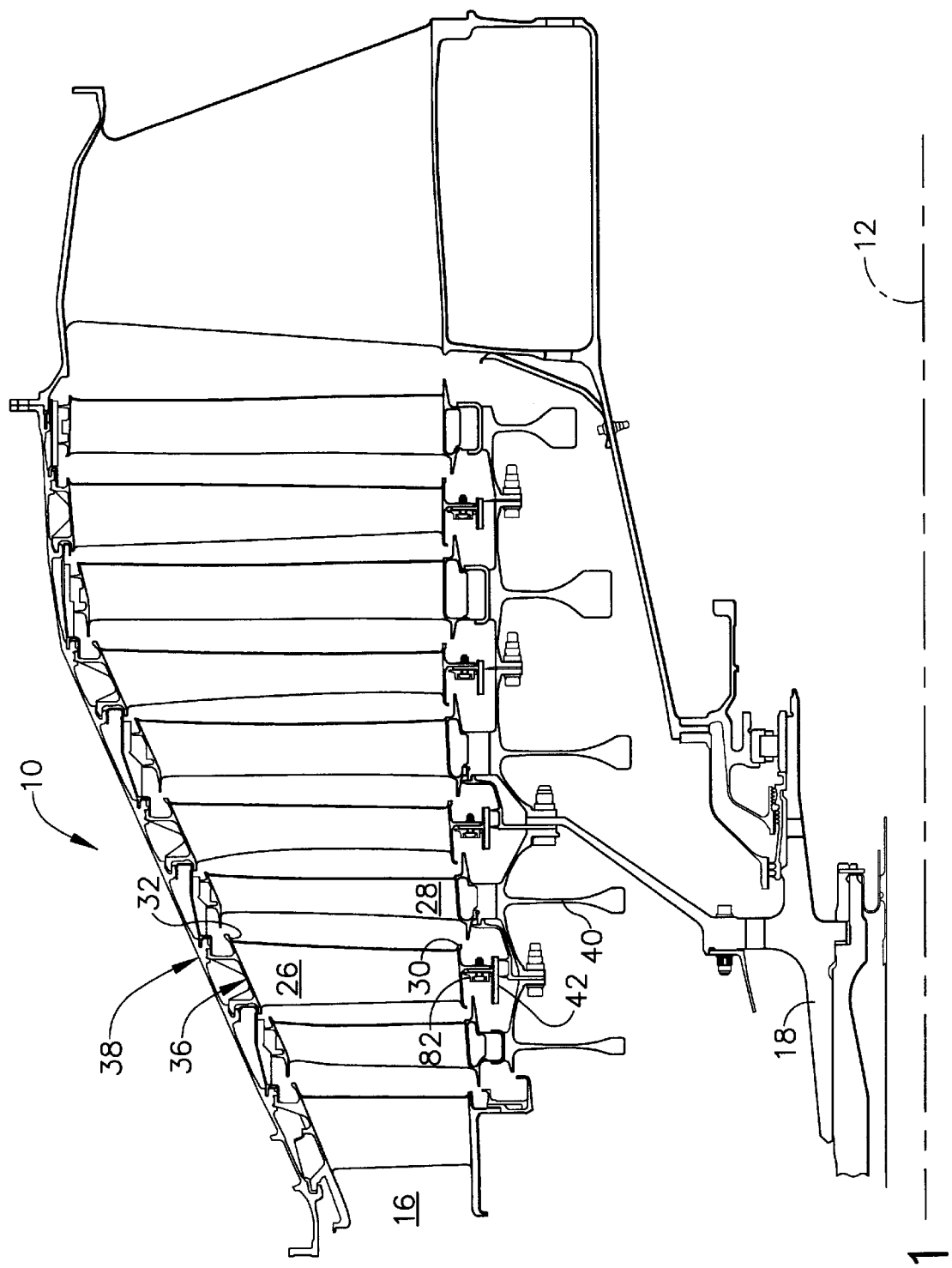
FIG. 1 is a schematic cross-sectional view illustration of a gas turbine engine low pressure turbine section having a vane and radially inner seal assembly with an exemplary embodiment of a seal retainer of the present invention.

FIG. 1 is a partial cutaway view of a highly simplified schematic illustration of an exemplary gas turbine engine low pressure turbine section 10 arranged substantially concentrically about an engine centerline 12 and aft of a high pressure turbine section 16. The low pressure turbine section 10 rotates the fan section of the engine (not shown) and other components through a rotor shaft 18. The turbine section 10 includes alternating annular arrays of nozzle vanes 26 and rotor blades 28, the vanes 26 and blades 28 being airfoils for reacting the hot gas stream. The nozzle vanes 26 are attached to a radially outer band 32 and a radially inner ring or platform 30 to form non-rotating annular nozzle stages 36. The nozzle stages are suitably attached to and supported by an annular outer engine casing 38. Each of the rotor blades 28 is attached at its radially inner end to periphery of a disk 40 which is attached to the rotor shaft 18.

Figure 2:
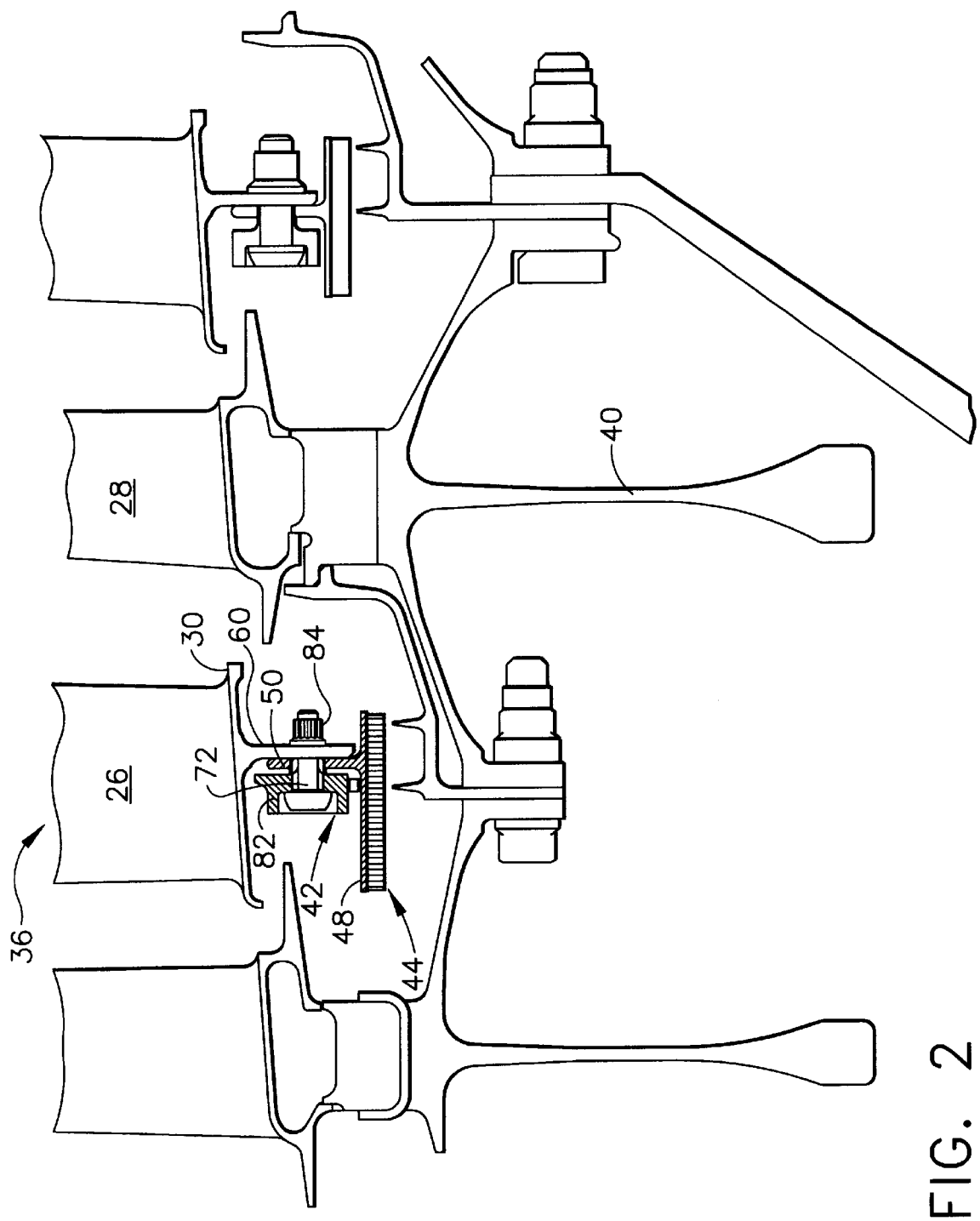
FIG. 2 is an enlarged schematic cross-sectional view illustration of the vane and radially inner seal assembly and retainer in FIG. 1.

Referring more particularly to FIG. 2 in conjunction with FIG. 1, an inter-stage seal assembly 42 (shown in greater detail in FIG. 2) is used for reducing gas leakage around the nozzle stage 36. The hot gases passing through the turbine section 10 heat the various components, such as the vanes 26 and blades 28, the bands 32, the platforms 30 and the disks 40 and cause them to thermally expand. Since the components may be made of diverse materials, may have diverse material thicknesses, and may be subject to diverse rates of heating, each component may expand differently. The seal assembly 42 is adapted to accommodate differential expansion in a radial direction and similar contraction as components cool.

Figure 3:
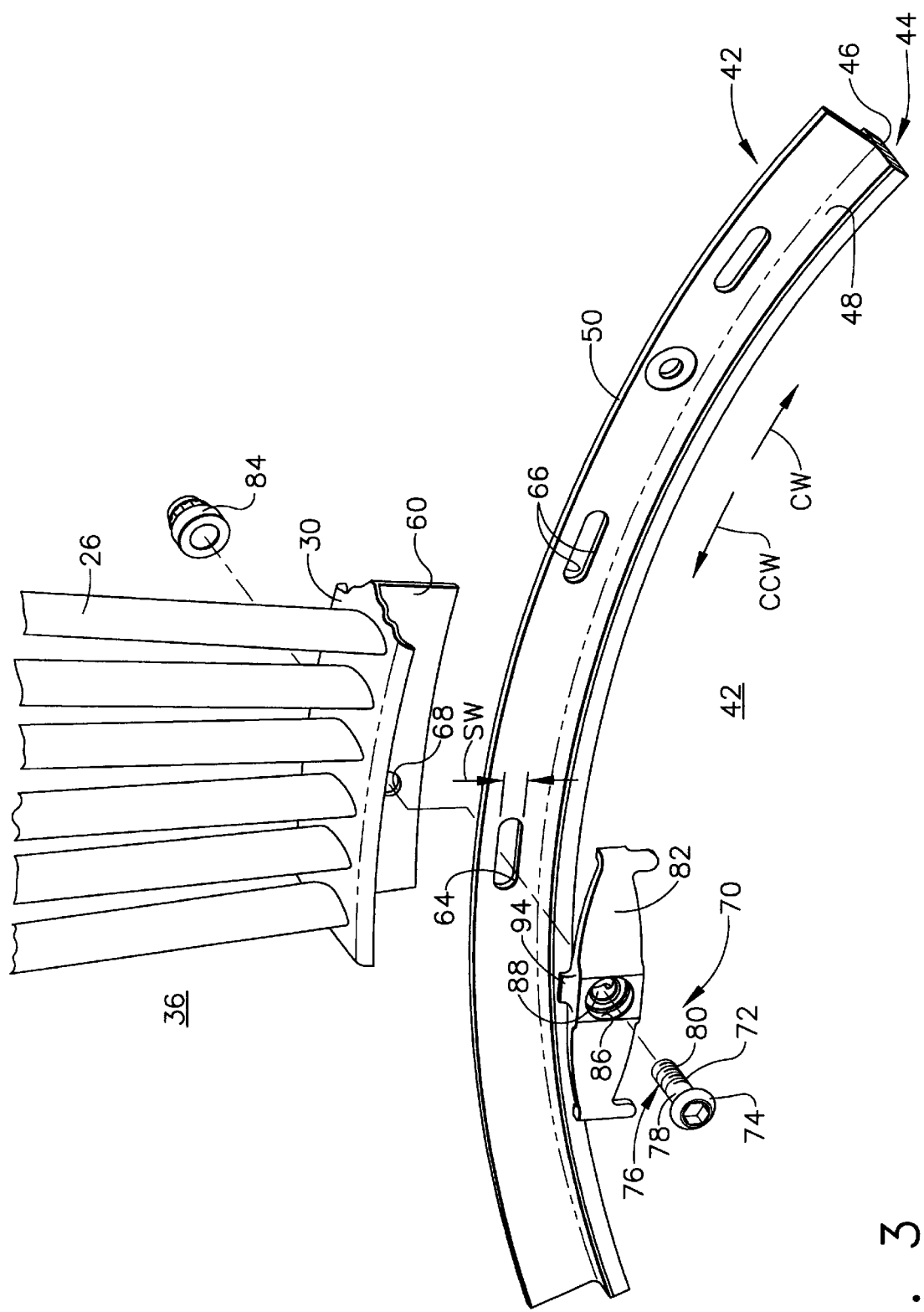
FIG. 3 is a forward looking aft exploded perspective view illustration of the vane and radially inner seal assembly and retainer in FIG. 1.

Referring more particularly to FIGS. 2 and 3, the seal assembly 42 includes a radially inner abradable shroud assembly 44 having an abradable annular honeycomb seal member 46 fixedly attached to an annular seal ring 48 by brazing, welding, or other suitable means well known in the art. The seal ring 48 incudes an annular seal ring flange 50 for mounting the abradable shroud assembly 44 to an annular platform flange 60 extending radially inwardly from the inner platform 30 of the nozzle vane 26.

The seal assembly 42 is mounted and secured to the annular platform flange 60 by a bolt assembly 70 as illustrated in exploded view in FIG. 3. A plurality of circumferentially spaced slots 64 formed in and extending through the annular seal ring flange 50 are located to generally align radially and circumferentially with holes 68 in the annular platform flange 60. The slots 64 have straight slot edges 66 extending lengthwise tangentially with respect to the annular seal ring flange 50 and slot widths SW between the slot edges. The bolt assembly 70 including a bolt 72 having a socket type bolt head 74 and a shank 76 with un-threaded and threaded shank portions 78 and 80, respectively and a nut 84 which threads onto the threaded shank portion 80.

The bolt 72 is designed to be held with a loose fit in an inter-stage seal retainer 82 during assembly and disassembly of the seal assembly 42 to the annular platform flange 60 of the inner platform 30. The bolt head 74 sits in a counter-bore 86 of a bore 88 having a bore axis 89 in the inter-stage seal retainer 82. Further referring to FIG. 7, the inter-stage seal retainer 82 cooperates with the slots 64 to constrain seal assembly 42, while permitting differential radial expansion and contraction between the seal assembly 42 and the inner platform 30.

Figure 4:
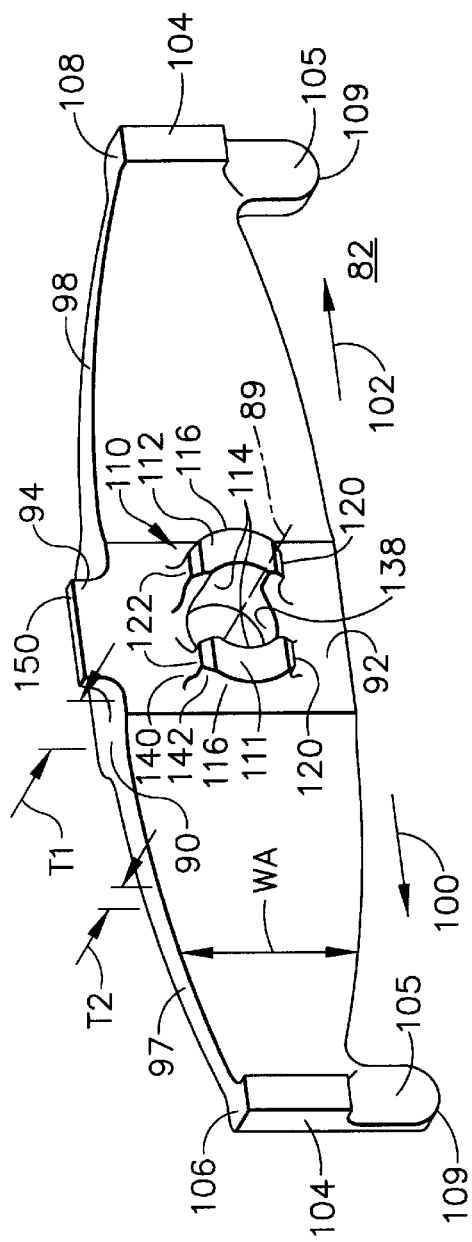
FIG. 4 is an aft looking forward perspective view illustration of the retainer in FIG. 2.
Figure 5:
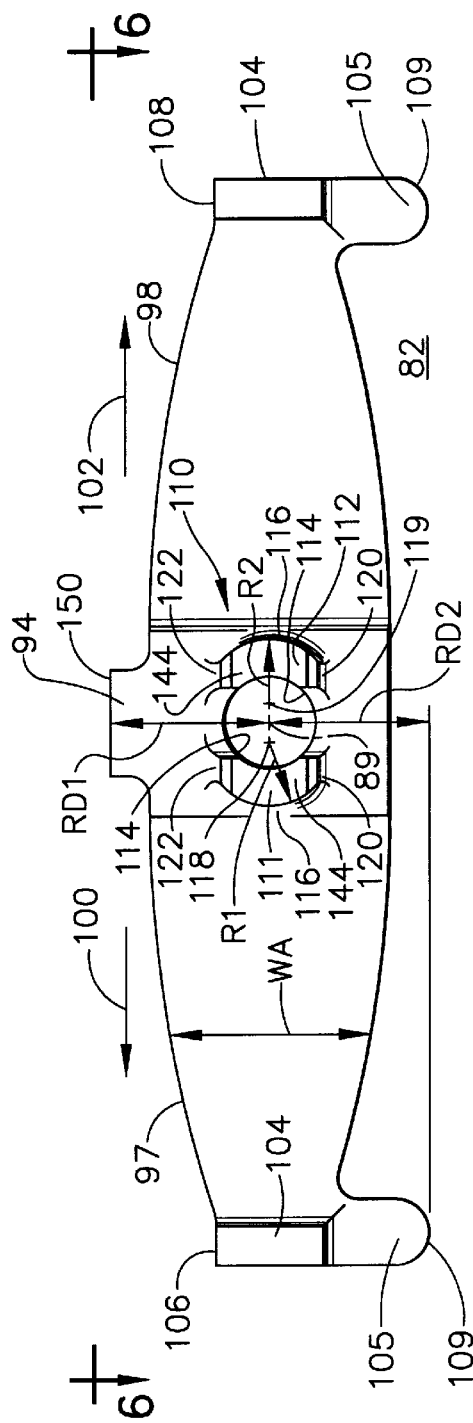
FIG. 5 is an aft looking forward elevational view illustration of the retainer in FIG. 4.
Figure 6:
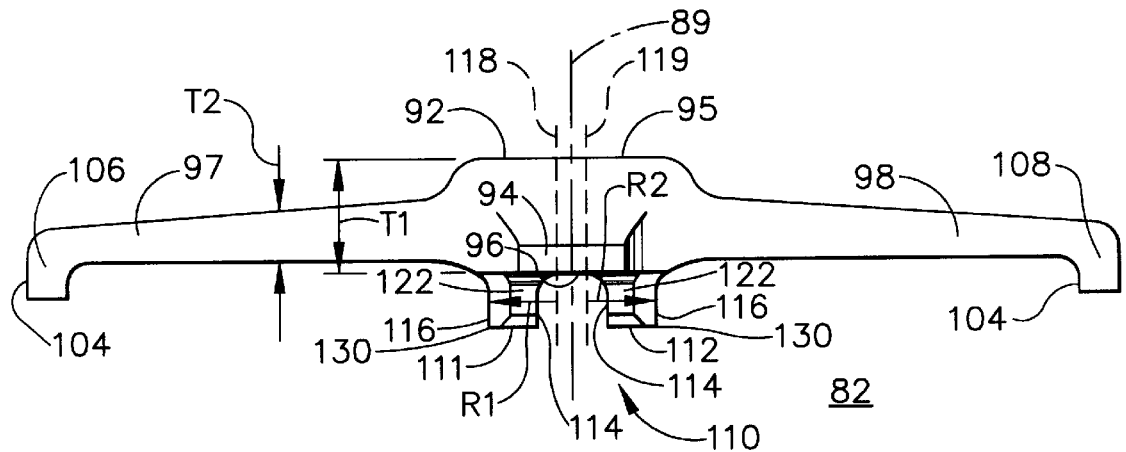
FIG. 6 is a radially inwardly looking elevational view illustration of the retainer in FIG. 4.

Further referring to FIGS. 4, 5, and 6, the retainer 82 includes a body 90 with a central portion 92 through which the counter-bore 86 and the bore 88 are formed. The central portion 92 has square flat forward and aft facing central surfaces 95 and 96, respectively, with the counter-bore 86 extending aft from the forward facing central surface 95. A central tab 94 extends radially outwardly from the central portion 92 and is flush with the flat central aft facing surface 96 of the central portion 92. Mirror image first and second arms 97 and 98, respectively, extend in opposite respective first and second tangential directions 100 and 102, with respect to the bore axis 89, away from the central portion 92 and each other. Axial spacers 104 extends aftwardly from first and second free ends 106 and 108 of the first and second arms 97 and 98, respectively. Anti-rotation feet 105 with rounded ends 109 depend or extend radially inwardly, with respect to the engine centerline 12, from the first and second free ends 106 and 108 of the first and second arms 97 and 98, respectively.

The central portion 92 has a substantially constant first thickness T1 and is axially thicker than the first and second arms 97 and 98, respectively, which have a second thickness T2 that is less than first thickness T1. In the exemplary embodiment, the second thickness T2 tapers down as the first and second arms 97 and 98, respectively, extend outwardly in the first and second tangential directions 100 and 102 away from the central portion 92. In the exemplary embodiment, an arm width WA tapers curvedly down as the first and second arms 97 and 98, respectively, extend outwardly in the first and second tangential directions 100 and 102 away from the central portion 92. The first and second arms 97 and 98, respectively, are axially offset with respect to the central portion 92 and are located closer to the axial position of the aft facing central surface 96 than the axial position of the forward facing central surface 95 of the central portion 92.

A pedestal assembly 110 having mirror image first and second pedestals 111 and 112, respectively, extend aft from the central portion 92 and normal (at a right angle) to the flat aft facing central surface 96 of the central portion 92. Each of the first and second pedestals 111 and 112 are semi-annular in shape with semi-annular cylindrical inner and outer surfaces 114 and 116, respectively. The semi-annular cylindrical inner surfaces 114 are circumscribed around the bore axis 89 and extend between generally parallel spaced apart radially inner and outer flat surfaces with respect to the bore axis 89, referred to hereinafter as radially inner and outer flats 120 and 122, respectively. The semi-annular cylindrical outer surfaces 116 of the first and second pedestals 111 and 112 are circumscribed around first and second offset axes 118 and 119 by a first radius R1 and a second radius R2, respectively, and extend between the inner and outer flats 120 and 122, respectively. The first offset axis 118 and the second offset axis 119 are offset a small distance from and on opposite sides of the bore axis 89. The radially inner flats 120 on the first and second pedestals 111 and 112 are coplanar and the radially outer flats 122 on the first and second pedestals 111 and 112 are coplanar. When the inter-stage seal assembly 42 is assembled the assembly 110 and the first and second pedestals 111 and 112 are inserted through the slots 64 the radially inner and outer flats 120 and 122 are parallel to the slot edges 66.

Figure 7:
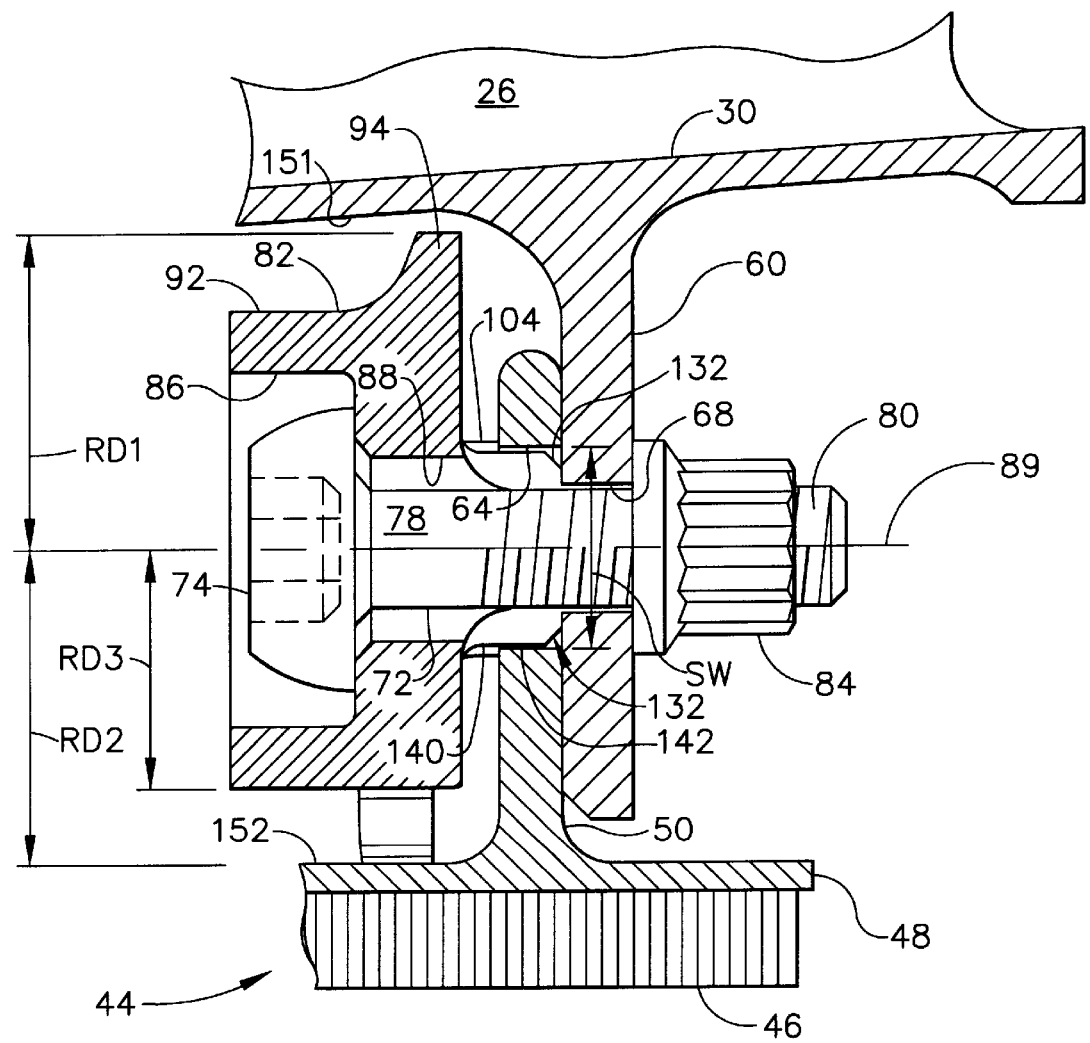
FIG. 7 is a schematic cross-sectional view illustration of the retainer inserted into a slot of an annular flange of the inner seal in FIG. 3.

Axially outer ends 130, with respect to the bore axis 89, of the first and second pedestals 111 and 112 have chamfers 132 along the radially inner and outer flats 120 and 122, respectively. The semi-annular cylindrical inner surfaces 114 are substantially continuous with a bore surface 138 inside of the bore 88. The first and second pedestals 111 and 112 and their respective cylindrical inner and outer surfaces 114 and 116 are substantially normal and straight from the chamfers 132 to the flat aft facing central surface 96 of the central portion 92. There is a flare or fillet 140 between the first and second pedestals 111 and 112 at the intersection of the first and second pedestals 111 and 112 and the central portion 92 along the cylindrical inner and outer surfaces 114 and 116 and the flat aft facing central surface 96. Pedestal shank sections 142 of constant cross-section extend between the chamfers 132 and the flares or fillets 140 as illustrated in FIG. 7.

The outer ends 130 of the first and second pedestals 111 and 112 have flat pedestal end surfaces 144 that are substantially parallel to the flat central aft facing surface 96 of the central portion 92. The flat pedestal end surfaces 144 are designed to seat flat against the annular platform flange 60 to which it is mounted and secured by the bolt assembly 70 as shown in FIGS. 2 and 7. This traps and retains the seal ring 48 by way of the seal ring flange 50 between the axial spacers 104 that extend aftwardly from the first and second free ends 106 and 108 of the first and second arms 97 and 98 of the retainer 82 and the platform flange 60 extending radially inwardly from the inner platform 30 of the nozzle vane 26.

The plurality of circumferentially spaced slots 64 formed in and extending through the annular seal ring flange 50 are located to generally align radially and circumferentially with the holes 68 in the annular platform flange 60. The central tab 94 has a radially outer tab end 150 spaced a first radial distance RD1 away from the bore axis 89. The rounded ends 109 of the anti-rotation feet 105 extend radially inward to a second radial distance RD2 away from the bore axis 89. First and second radial distances RD1 and RD2 are unequal and are substantially the same distances from a radially inwardly facing annular platform surface 151 of the radially inner platform 30 and a radially outwardly facing annular platform surface 152 of the annular seal ring 48. The first radial distance RD1 is greater than a third radial distance RD3 between the bore axis 89 and the central portion 92 through which the counter-bore 86 is formed.

This arrangement referred to as "fool proof" because the design makes it impossible for an assembler to install the inter-stage seal retainer 82 upside down with the first and second pedestals 111 and 112 disposed through the slot 64. If the assembler tries to install the inter-stage seal retainer 82 upside down, the central tab 94 creates, by interference with the annular seal ring 48, a misalignment with the bolt 72 and the hole 68 in the annular platform flange 60 such that the bolt cannot be installed and the nut 84 can not be attached and torqued.

Proper installation of the inter-stage seal retainer 82 enables the anti-rotation feet 105 to restrict rotation of the retainer relative to the annular seal ring 48 to no more than about a couple of degrees, approximately 2.3• in the exemplary embodiment, about the bore axis 89 in either the clockwise CW or counter-clockwise CCW directions. This is accomplished by either of the anti-rotation feet 105 contacting the seal ring 48. The rounded ends 109 of the anti-rotation feet 105 allows restriction of rotation of the retainer 82 with a minimal amount of contact with the ring and thus reduces retainer interference with axial and circumferential restrained movement between the seal ring 48 and the annular platform flange 60 during engine operation. The rounded ends 105 also minimizes interference of the retainer 82 and the seal ring 48 during installation of the retainer and during torquing of the bolt 72.

Additional relative rotation between the retainer 82 and the seal ring 48 is reduced by the action of the chamfers 132 on the first and second pedestals 111 and 112 against the straight slot edges 66 of the slots 64 formed in and extending through the annular seal ring flange 50. The chamfers 132 are an inclined plane relative to the seal slot edges 66 and during final assembly and torquing of the bolt and nut, the bolt clamp load causes the retainer to rotate and align with the straight slot edges 66. The invention provides full and proper seating of the retainer 82 on the annular platform flange 60 of the nozzle vane 26 and the pedestal assembly 110 and the pedestals 111 and 112 on the slot 64 on the platform flange.

During assembly at the initial interface of the retainer 82 and seal ring 48, the chamfers 132 guide the pedestals 111 and 112 of the pedestal assembly 110 and the retainer 82 into the slot 64 in seal ring flange 50. The features of the present invention enable the retainer 82 to be aligned with the seal slot 64 regardless of the looseness of the subassembly joint between the seal assembly 42 and the platform flange 60 of the vane 26.

Preferably the retainer 82 is an integrally cast unit, including the body 90, the central portion 92, the central tab 94, the first and second arms 97 and 98, axial spacers 104, anti-rotation feet 105, and the pedestal assembly 110 including the first and second pedestals 111 and 112. The integral casting of the retainer 82 improves repeatability and thus improves production of the retainer and reliability and ease of assembly of the retainer and the inter-stage seal assembly 42. The integral casting reduces production costs and improves dimensional control and accuracy of the retainer and the inter-stage seal assembly 42.

While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. A retainer comprising:
    a body having a central portion through which a bore is formed around a bore axis,
    a central tab extending radially outwardly from said central portion with respect to said bore axis,
    first and second arms, respectively, extend in opposite respective first and second tangential directions, with respect to said bore axis, away from said central portion and each other,
    axial spacers extending aftwardly from first and second free ends of said first and second arms, respectively,
    anti-rotation feet depending from said first and second free ends in an opposite direction from which said central tab extends,
    a pedestal assembly extending aft from said central portion and is located aft of said central tab,
    said pedestal assembly having at least a semi-annular cylindrical inner surface circumscribed around said bore axis and a semi-annular cylindrical outer surface,
    said semi-annular cylindrical outer surface extending between generally parallel spaced apart radially inner and outer flats, respectively with respect to said bore axis, and
    said radially inner flats being coplanar and said radially outer flats being coplanar, and
    chamfers along said radially inner and outer flats, respectively.

2. A retainer as claimed in claim 1 wherein said retainer is an integrally cast unit including said body, said central portion, said central tab, said first and second arms, said axial spacers, said anti-rotation feet, and said pedestal assembly.

3. A retainer as claimed in claim 2 wherein said pedestal assembly includes first and second mirror image pedestals, respectively, extending aft from said central portion, and said first and second pedestals are semi-annular in shape and include said semi-annular cylindrical outer surface, and said cylindrical inner surface which is semi-annular and extends between said inner and outer flats.

4. A retainer as claimed in claim 3 wherein said anti-rotation feet have rounded ends.

5. A retainer as claimed in claim 4 wherein said cylindrical inner surface is substantially continuous with a bore surface inside of said bore.

6. A retainer as claimed in claim 1 wherein said central tab is flush with a flat central aft facing surface of said central portion.

7. A retainer as claimed in claim 6 wherein said retainer is an integrally cast unit including said body, said central portion, said central tab, said first and second arms, said axial spacers, said anti-rotation feet, and said pedestal assembly.

8. A retainer as claimed in claim 7 wherein said pedestal assembly includes first and second mirror image pedestals, respectively, extending aft from said central portion, and said first and second pedestals are semi-annular in shape and include said semi-annular cylindrical outer surface, and said cylindrical inner surface which is semi-annular and extends between said inner and outer flats.

9. A retainer as claimed in claim 8 wherein said anti-rotation feet have rounded ends.

10. A retainer as claimed in claim 9 wherein said cylindrical inner surface is substantially continuous with a bore surface inside of said bore.

11. A retainer as claimed in claim 10 further comprising a counter-bore of said bore circumscribed about said bore axis.

12. A retainer as claimed in claim 11 wherein said first and second pedestals and said cylindrical inner and outer surfaces are substantially normal and straight from said chamfers to said flat aft facing central surface of said central portion.

13. A retainer as claimed in claim 11 further comprising a fillet between each of said first and second pedestals between said first and second pedestals and said central portion along said cylindrical inner and outer surfaces and said flat aft facing central surface.

14. A retainer as claimed in claim 12 further comprising pedestal shank sections of constant cross-section extending between said chamfers and said fillets.

15. A retainer as claimed in claim 7 wherein said anti-rotation feet have rounded ends.

16. An assembly comprising:
an annular first ring having a perpendicular annular first flange extending radially inwardly from said first ring,
an annular second ring having a perpendicular annular second flange extending radially outwardly from said second ring and to which said first flange is retained by a retainer,
a plurality of circumferentially spaced slots formed in and extending through said first flange and located to generally align radially and circumferentially with holes in said second flange,
said slots having straight slot edges extending lengthwise tangentially with respect to said first flange,
said retainer operably associated with each of said slots and secured to said second flange to constrain circumferential rotation of said first flange while permitting differential radial expansion and contraction between said first and second flanges;
said retainer comprising;
a body having a central portion through which a bore is formed around a bore axis,
a central tab extending radially outwardly from said central portion with respect to said bore axis,
first and second arms, respectively, extend in opposite respective first and second tangential directions, with respect to said bore axis, away from said central portion and each other,
axial spacers extending aftwardly from first and second free ends of said first and second arms, respectively, such that said first flange is trapped between said axial spacers and said second flange,
anti-rotation feet depending from said first and second free ends in an opposite direction from which said central tab extends,
a pedestal assembly extending aft from said central portion and is located aft of said central tab disposed through said slots,
said pedestal assembly has at least a semi-annular cylindrical inner surface circumscribed around said bore axis and a semi-annular cylindrical outer surface,
said semi-annular cylindrical outer surface extending between generally parallel spaced apart radially inner and outer flats, respectively with respect to said bore axis,
said radially inner flats being coplanar and said radially outer flats being coplanar,
said radially inner flats being parallel to said straight slot edges,
a bolt having a bolt head that engages said retainer and a shank disposed said bore, one of said slots of said first flange, and an aligned one of said holes in said second flange,
shank having un-threaded and threaded shank portions, respectively and a nut which threads onto said threaded shank portion and seats against said second flange so as to secure said retainer to said second flange.

17. An assembly as claimed in claim 16 wherein said retainer is an integrally cast unit including said body, said central portion, said central tab, said first and second arms, said axial spacers, said anti-rotation feet, and said pedestal assembly.

18. An assembly as claimed in claim 17 wherein said pedestal assembly includes first and second mirror image pedestals, respectively, extending aft from said central portion, and said first and second pedestals are semi-annular in shape and include said semi-annular cylindrical outer surface, and said cylindrical inner surface which is semi-annular and extends between said inner and outer flats.

19. An assembly as claimed in claim 18 wherein said anti-rotation feet have rounded ends.

20. An assembly as claimed in claim 19 wherein said cylindrical inner surface is substantially continuous with a bore surface inside of said bore.

21. An assembly as claimed in claim 20 wherein said central tab is flush with a flat central aft facing surface of said central portion.

22. An assembly as claimed in claim 21 further comprising a counter-bore of said bore circumscribed about said bore axis and said bolt head sitting said counter-bore.

23. An assembly as claimed in claim 22 wherein said first and second pedestals and said cylindrical inner and outer surfaces are substantially normal and straight from said chamfers to said flat aft facing central surface of said central portion.

24. An assembly as claimed in claim 23 further comprising a fillet between each of said first and second pedestals between said first and second pedestals and said central portion along said cylindrical inner and outer surfaces and said flat aft facing central surface.

25. An assembly as claimed in claim 24 further comprising pedestal shank sections of constant cross-section extending between said chamfers and said fillets.

26. An assembly as claimed in claim 16 wherein said assembly is a gas turbine engine inter-stage seal assembly further comprising:

an abradable shroud assembly having an abradable annular honeycomb seal member fixedly attached to said annular first ring, an annular nozzle stage having nozzle vanes attached to said annular second ring.

27. An assembly as claimed in claim 26 wherein said retainer is an integrally cast unit including said body, said central portion, said central tab, said first and second arms, said axial spacers, said anti-rotation feet, and said pedestal assembly.

28. An assembly as claimed in claim 27 wherein said pedestal assembly includes first and second mirror image pedestals, respectively, extending aft from said central portion, and said first and second pedestals are semi-annular in shape and include said semi-annular cylindrical outer surface, and said cylindrical inner surface which is semi-annular and extends between said inner and outer flats.

29. An assembly as claimed in claim 28 wherein said anti-rotation feet have rounded ends.

30. An assembly as claimed in claim 29 wherein said cylindrical inner surface is substantially continuous with a bore surface inside of said bore.

31. An assembly as claimed in claim 30 wherein said central tab is flush with a flat central aft facing surface of said central portion.

32. An assembly as claimed in claim 31 further comprising a counter-bore of said bore circumscribed about said bore axis and said bolt head sitting in said counter-bore.

33. An assembly as claimed in claim 32 wherein said first and second pedestals and said cylindrical inner and outer surfaces are substantially normal and straight from said chamfers to said flat aft facing central surface of said central portion.

34. An assembly as claimed in claim 33 further comprising a fillet between each of said first and second pedestals between said first and second pedestals and said central portion along said cylindrical inner and outer surfaces and said flat aft facing central surface.

35. An assembly as claimed in claim 33 wherein said central portion has a substantially constant first thickness that is axially thicker than a second thickness of said first and second arms.

36. An assembly as claimed in claim 34 wherein said second thickness tapers down as said first and second arms, respectively, extend outwardly in said first and second tangential directions away from said central portion.

\* \* \* \* \*